United States Patent Office 3,162,635
Patented Dec. 22, 1964

3,162,635
1,2,3,4-TETRAHYDRO-2,4-PTERIDINEDIONES
AND INTERMEDIATES
Elmer F. Schroeder, Chicago, Ill., assignor to G. D.
Searle & Co., Chicago, Ill., a corporation of Delaware
No Drawing. Filed Aug. 6, 1962, Ser. No. 214,845
20 Claims. (Cl. 260—251.5)

The present invention relates to novel nitrogen-containing heterobicyclic compounds and, more particularly, to compounds characterized by the 1,2,3,4-tetrahydro-2,4-pteridinedione ring system, as represented by the structural formula

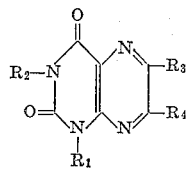

wherein $R_1$ can be a lower alkenyl or [di-(lower alkyl)-amino(lower alkylene)] radical, $R_2$ is an optionally hydroxylated lower alkyl radical, $R_3$ is symbolic of hydrogen or a lower alkyl, phenyl, or furyl radical, and $R_4$ is indicative of hydrogen or a lower alkyl, phenyl, furyl, or hydroxy radical.

Examples of the lower alkyl radicals represented in the foregoing structural formula are methyl, ethyl, propyl, butyl, pentyl, hexyl, and the branched-chain radicals isomeric therewith. The bivalent lower alkylene radicals encompassed in the $R_1$ term are, typically, methylene, ethylene, trimethylene, tetramethylene, pentamethylene, and the branched-chain radicals thereof.

As indicated supra, the $R_1$ term can symbolize also a lower alkenyl radical, for example, vinyl, allyl, propenyl, methallyl, butenyl, pentenyl, hexenyl, and the corresponding branched-chain groups isomeric therewith. Hydroxylated alkyl radicals are, for example, 2-hydroxyethyl, 3-hydroxypropyl, 4-hydroxybutyl, 2,3-hydroxypropyl, 2-hydroxypropyl, and the corresponding branched-chain radicals.

The 1,2,3,4-tetrahydro-2,4-pteridinediones of this invention are conveniently obtained by reaction of a 5,6-diaminouracil with a 1,2-dicarbonyl compound as illustrated below:

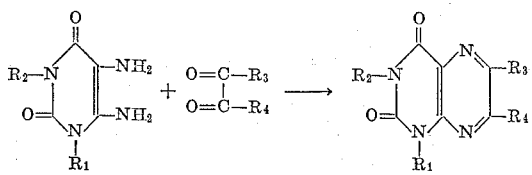

wherein $R_1$, $R_2$, and $R_3$ have the identical meanings designated supra and $R_4$ can be hydrogen or a lower alkyl, phenyl, furyl, or a lower alkoxy radical such as methoxy or ethoxy. This process is preferably conducted by heating the reactants in a suitable aqueous solvent medium at a temperature of 80–100° and a pH of 5–7 for a period of 15 minutes–2 hours. The lower alkanols such as methanol and ethanol exemplify organic solvents suitable for utilization in this procedure. A specific example of the process is the reaction of 1-(2-dimethylaminoethyl)-3-ethyl-5,6-diaminouracil with 2,3-butanedione in aqueous solution at the steam bath temperature to yield 1-(2-dimethylaminoethyl)-3-ethyl-6,7-dimethyl-1,2,3,4 - tetrahydro-2,4-pteridinedione.

The 5,6-diaminouracils containing a 1-dialkylaminoalkyl substituent are obtained by a sequence of reactions involving first the condensation of a dialkylaminoalkylamine with an alkyl isocyanate to afford the corresponding N-dialkylaminoalkyl-N'-alkylurea, reaction of that urea with cyanoacetic acid, resulting in a 1-dialkylaminoalkyl-3-alkyl-6-aminouracil, nitrosation with nitrous acid to produce the corresponding 5-nitroso derivative and, finally, reduction, typically with sodium hydrosulfite, resulting in the desired 5,6-diaminouracils. A specific example involves reaction of 2-dimethylaminoethylamine with ethyl isocyanate, affording N-(2-dimethylaminoethyl)-N'-ethylurea, conversion of that substance to 1-(2-dimethylaminoethyl)-3-ethyl-6-aminouracil by reaction with cyanoacetic acid, nitrosation with sodium nitrite in acetic acid to afford the 5-nitroso derivative, and reduction with sodium hydrosulfite, resulting in 1-(2-dimethylaminoethyl)-3-ethyl-5,6-diaminouracil.

The 5,6-diaminouracils characterized by a 1-alkenyl substituent are obtained by subjecting 6-aminouracils of the structural formula

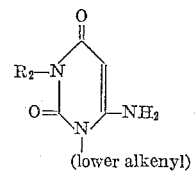

to the nitrosation and reduction processes described supra, $R_2$ having the identical meaning indicated supra. Typically, 1-allyl-6-aminouracil is contacted with 1-chloro-2-propanol to yield 1-allyl-3-(2-hydroxypropyl)-6-aminouracil, the latter substance is heated with sodium nitrite in acetic acid, resulting in the 5-nitroso derivative, which is reduced with sodium hydrosulfite in an aqueous ammoniacal solution to produce 1-allyl-3-(2-hydroxypropyl)-5,6-diaminouracil.

Equivalent to the instant amines for the purposes of this invention are the corresponding non-toxic acid and quaternary salts, exemplified by the citrate, tartrate, maleate, ascorbate, gluconate, lactate, succinate, phosphate, sulfate, hydrobromide, hydrochloride, methiodide, ethiodide, methochloride, methobromide, methosulfate, ethosulfate, etc.

The compounds of the present invention display valuable pharmacological properties. They are, for example, diuretic, anti-inflammatory, and central nervous system-depressing agents. In addition, they possess antibacterial properties as is indicated by their ability to inhibit the growth of *Diplococcus pneumoniae*, *Bacillus subtilis*, and *Escherichia coli*.

The compounds which constitute this invention and the methods for their production will appear more fully from the examples below. These examples, however, are given for the purpose of illustration only and are not to be construed as limiting the invention either in spirit or in scope. In these examples, temperatures are given in degrees centigrade (° C.), and quantities of materials in parts by weight unless otherwise noted.

*Example 1*

To a solution of 176 parts of 2-dimethylaminoethylamine in 500 parts of water, cooled to 0–5°, is added slowly 146 parts of ice-cold ethyl isocyanate while the temperature is kept at 25–35°. Stirring is continued for about 15 minutes longer, at the end of which time the pH is adjusted to approximately 7 by the addition of about 170 parts by volume of concentrated hydrochloric acid. Evaporation to dryness in vacuo of this neutralized mixture affords N-(2-dimethylaminoethyl)-N'-ethylurea hydrochloride, obtained as a syrup.

A mixture of 391 parts of N-(2-dimethylaminoethyl)-N'-ethylurea hydrochloride, 176 parts of cyanoacetic acid, and 378 parts of acetic anhydride is heated to about 75°, at which point a spontaneous reaction occurs, resulting in a brief temperature rise to about 100°. After this spontaneous reaction subsides, the reaction mixture is heated on the steam bath for about one hour, then is treated with 50 parts of water. The solvents are removed by distillation at reduced pressure, and the resulting syrup is dissolved in about 750 parts of water. This aqueous solution is adjusted to about pH 8 by the addition of about 60 parts by volume of 70% aqueous sodium hydroxide, after which an additional 25 parts by volume of 70% aqueous sodium hydroxide is added cautiously. The latter addition results in a rapid temperature rise to about 72°. After cooling of the reaction mixture to room temperature, a solution of 80 parts of sodium hydroxide in 200 parts of water is added, and this aqueous mixture is extracted with 1125 parts of chloroform. The chloroform extract is dried over anhydrous sodium sulfate, then is evaporated to dryness on a steam bath to afford the crystalline product. Trituration of this product with ethyl acetate at about 50° for about 15 minutes followed by filtration, washing with ethyl acetate, and drying produces colorless crystals of pure 1-(2-dimethylaminoethyl)-3-ethyl-6-aminouracil, melting at about 177–179°.

To a solution of 45.3 parts of 1-(2-dimethylaminoethyl)-3-ethyl-6-aminouracil in 300 parts of water is added 19 parts of concentrated hydrochloric acid in order to adjust the pH to about 7. The resulting solution is heated to about 80°, 12.6 parts of acetic acid is added, and 14.5 parts of sodium nitrite is then added portionwise over a period of about 3 minutes. The resulting reaction mixture is heated at 80° for about 10 minutes longer to afford a purple-colored solution containing 1-(2-dimethylaminoethyl)-3-ethyl-5-nitroso - 6 - aminouracil hydrochloride. This solution is cooled to about 50°, then is treated successively with 67.5 parts of concentrated ammonium hydroxide and 85 parts of sodium hydrosulfite. A spontaneous temperature rise to about 75° occurs during the ensuing 5 minutes. This reaction mixture is heated at 80° for about 20 minutes longer, then is cooled and diluted with water to a total volume of about 400 parts. This solution contains 1-(2-dimethylaminoethyl)-3-ethyl-5,6-diaminouracil hydrochloride. To the latter solution is added about 100 parts by volume of 5 N aqueous sodium hydroxide, and this basic solution is extracted with methylene chloride. The organic solution is separated, dried over anhydrous sodium sulfate, and concentrated to dryness at reduced pressure. Crystallization of the resulting brownish solid residue from ethyl acetate affords pure 1-(2-dimethylaminoethyl)-3-ethyl-5,6 - diaminouracil, obtained as a pale yellow solid melting at about 83–86°.

*Example 2*

The substitution of 260 parts of 3-diethylaminopropylamine and 170 parts of n-propyl isocyanate in the procedure of Example 1 results in 1-(3-diethylaminopropyl)-3-n-propyl-5,6-diaminouracil.

*Example 3*

To a mixture of 44.8 parts of 1-allyl-3-ethyl-5-nitroso-6-aminouracil, 500 parts of water, and 49.5 parts of concentrated ammonium hydroxide, heated to about 40°, is added 70 parts of sodium hydrosulfite, resulting in a rapid temperature rise to about 70°. After the spontaneous reaction subsides, the reaction mixture is heated at about 80–85° for about 10 minutes longer, then is cooled and extracted with methylene dichloride. This organic extract is dried over anhydrous sodium sulfate, and is evaporated to dryness. Recrystallization of the tan-colored residue from ethyl acetate results in pure colorless crystals of 1-allyl-3-ethyl-5,6-diaminouracil, melting at about 143–145°.

*Example 4*

By substituting 47.6 parts of 1-methallyl-3-ethyl-5-nitroso-6-aminouracil in the procedure of Example 3, 1-methallyl-3-ethyl-5,6-diaminouracil is obtained.

*Example 5*

To a solution of 83.5 parts of 1-allyl-6-aminouracil in 125 parts of water containing 21 parts of sodium hydroxide is added successively 120 parts of ethanol and 50 parts of 1-chloro-2-propanol. This reaction mixture is heated at the reflux temperature for about 4 hours, then is stripped of ethanol by distillation at reduced pressure. The residual aqueous mixture is diluted with water, is made alkaline by the addition of 25 parts by volume of 5 N aqueous sodium hydroxide, and is then stored at 5° for about 24 hours. The crystals which separate during this period are collected by filtration, washed on the filter with cold water, and dried to yield pure 1-allyl-3-(2-hydroxypropyl)-6-aminouracil, obtained as a colorless solid melting at about 170–172°.

To a solution of 45 parts of 1-allyl-3-(2-hydroxypropyl)-6-aminouracil in 180 parts of water, heated to about 80°, is added successively 14.5 parts of sodium nitrite, then, over a period of about 3 minutes, a solution of 14.7 parts of acetic acid in 50 parts of water. This reaction mixture is stirred and heated at 80–90° for about 4 minutes longer, during which time a voluminous purple-colored precipitate forms. The reaction mixture is then cooled, and the crystalline product is collected by filtration, is washed on the filter with water, and finally is dried to produce 1-allyl-3-(2-hydroxypropyl)-5-nitroso-6-aminouracil, the latter substance melting at about 216–218° (dec.).

To a mixture of 20.4 parts of 1-allyl-3-(2-hydroxypropyl)-5-nitroso-6-aminouracil, 100 parts of water, and 18 parts of concentrated ammonium hydroxide, warmed to about 40°, is added 25 parts of sodium hydrosulfite, resulting in a rapid temperature rise to about 80° and also in decolorization of the purple solution. The reaction mixture is kept at 80° for about 10 minutes longer, then is cooled and diluted with water. This aqueous solution contains 1-allyl - 3-(2-hydroxypropyl)-5,6-diaminouracil. Extraction with chloroform, drying of the organic extract over anhydrous sodium sulfate, and distillation of the solvent at reduced pressure affords 1-allyl-3-(2-hydroxypropyl) - 5,6 - diaminouracil as a yellowish solid.

*Example 6*

The substitution of 57.4 parts of 4-chloro - 1 - butanol in the procedure of Example 5 results in 1-allyl-3-(4-hydroxybutyl)-5,6-diaminouracil.

*Example 7*

A mixture of 16.7 parts of 1 - allyl-6-aminouracil, 25 parts of water, 4.2 parts of sodium hydroxide, 24 parts of ethanol, and 11.6 parts of 1 - chloro - 2,3 - dihydroxypropane is heated at the reflux temperature for about 4 hours, then is stripped of ethanol by distillation at reduced pressure. The remaining aqueous mixture is made alkaline by the addition of 5 parts by volume of 5 N aqeous sodium hydroxide, and this alkaline solution is diluted to about 65 parts by volume, then is kept at 5° for about 7 days. The crystals which separate during this storage period are collected by filtration, washed on the filter with ethanol, and dried to yield the crude product. Recrystallization from water affords pure 1 - allyl-3-(2,3-dihydroxypropyl)-6-aminouracil, melting at about 163–165°.

To a solution of 48.2 parts of 1-allyl-3-(2,3-dihydroxypropyl)-6-aminouracil in 180 parts of water, heated to about 85°, is added successively 14.5 parts of sodium nitrite and, portionwise over a period of about 3 minutes, a solution of 15.2 parts of acetic acid in 50 parts of water. This reaction mixture is kept at 85–90° for about 5 minutes longer, then is allowed to cool to room temperature and finally is cooled to 5°. The purple-colored crystals which separate during the cooling period are collected by filtration, washed on the filter with water, and dried to afford pure 1 - allyl-3-(2,3-dihydroxypropyl)-5-nitroso-6-aminouracil, melting at about 189–191° (dec.).

To a mixture of 21.6 parts of 1-allyl-3-(2,3-dihydroxypropyl)-5-nitroso-6-aminouracil, 100 parts of water, and 18 parts of concentrated ammonium hydroxide, heated to about 40°, is added 25 parts of sodium hydrosulfite. The temperature rises rapidly to about 80°, and decolorization of the purple reaction mixture occurs. Heating of this mixture at 80° for about 10 minutes longer followed by cooling and dilution with water yields an amber-colored solution containing 1-allyl-3-(2,3-dihydroxypropyl)-5,6-diaminouracil. Extraction of this aqueous mixture with chloroform followed by drying over anhydrous sodium sulfate and distillation of the solvent at reduced pressure affords the product in solid form.

*Example 8*

By substituting 13.1 parts of 3-chloro-2-methyl-1,2-propanediol and otherwise proceeding according to the procedure of Example 7, 1-allyl-3-(2,3-dihydroxy-2-methylpropyl)-5,6-diaminouracil is obtained.

*Example 9*

To 50 parts of an aqueous solution containing 6.05 parts of 1-(2-dimethylaminoethyl)-3-ethyl-5,6-diaminouracil hydrochloride is added a solution of 1.6 parts of glyoxal in 5.5 parts of water. This reaction mixture is kept at room temperature for about 15 minutes, then is heated on a steam bath for about 15 minutes. After cooling, 7.5 parts by volume of 5 N aqueous sodium hydroxide is added, and this aqueous mixture is extracted with methylene chloride. The organic extract is dried over anhydrous sodium sulfate and is evaporated to dryness to afford 1-(2-dimethylaminoethyl)-3-ethyl-1,2,3,4-tetrahydro-2,4-pteridinedione, obtained as a tan-colored solid melting at about 107–110°. It is characterized further by the structural formula

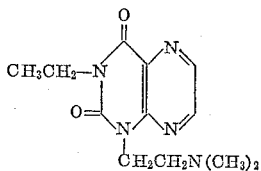

To a solution of 5 parts of the latter free base in 20 parts of methanol is added 4 parts by volume of 6.9 N methanolic hydrogen chloride and 63 parts of anhydrous ether. The resulting crystals are collected by filtration and washed on the filter with ether. Recrystallization from methanol-anhydrous ether affords pure 1-(2-dimethylaminoethyl)-3-ethyl-1,2,3,4-tetrahydro - 2,4 - pteridinedione hydrochloride as a colorless solid melting at about 233–235°.

*Example 10*

To a solution of 12.1 parts of 1-(2-dimethylaminoethyl)-3-ethyl-5,6-diaminouracil and 100 parts of water is added concentrated hydrochloric acid to pH 7. A solution of 4.8 parts of 2,3-butanedione in 50 parts of water is then added, and the resulting reaction mixture is heated on the steam bath for about 30 minutes. It is then cooled and made alkaline by the addition of about 15 parts by volume of 5 N aqueous sodium hydroxide, and this alkaline mixture is extracted with methylene dichloride. The organic layer is separated, dried over anhydrous sodium sulfate, and concentrated to dryness to afford 1-(2-dimethylaminoethyl)-3-ethyl-6,7-dimethyl-1,2,3,4 - tetrahydro-2,4-pteridinedione, obtained as a syrup.

To a solution of 11.5 parts of the latter syrup in 80 parts of absolute ethanol is added 10 parts by volume of 6.9 N ethanolic hydrogen chloride together with 140 parts of anhydrous ether. The resulting crystals are collected by filtration, washed on the filter with ether, and dried to produce 1-(2-dimethylaminoethyl)-3-ethyl-6,7-dimethyl-1,2,3,4-tetrahydro - 2,4 - pteridinedione hydrochloride, obtained as a tan-colored substance melting at about 258–260°. It is characterized further by the structural formula

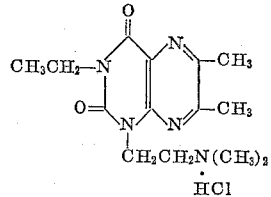

*Example 11*

To a solution of 12.1 parts of 1-(2-dimethylaminoethyl)-3-ethyl-5,6-diaminouracil hydrochloride in 150 parts of water is added successively 120 parts of ethanol, 10.5 parts of acetic acid, and 7.6 parts of phenylglyoxal monohydrate. This reaction mixture is heated at the reflux temperature for about 1 hour, then is stripped of ethanol by distillation at reduced pressure. This mixture is then made alkaline by the addition of 100 parts of water and 50 parts by volume of 5 N aqueous sodium hydroxide, resulting in separation of an oily layer. This oil is extracted into methylene dichloride, and the resulting organic solution is dried over anhydrous sodium sulfate, then is concentrated to dryness to afford 1-(2-dimethylaminoethyl) - 3 - ethyl-7-phenyl-1,2,3,4-tetrahydro-2,4-pteridinedione as a dark-colored solid.

The latter solid is dissolved in 80 parts of methanol, to which solution 10 parts by volume of 5.9 N ethanolic hydrogen chloride and 105 parts of anhydrous ether are added. The resulting crystals are collected by filtration and dried to yield 1-(2-dimethylaminoethyl)-3-ethyl-7-phenyl - 1,2,3,4-tetrahydro-2,4-pteridinedione hydrochloride, obtained as a pale yellow solid melting at about 289–291° (dec.). It is represented by the structural formula

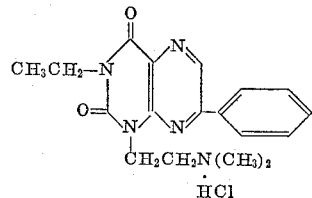

*Example 12*

To a solution of 12.1 parts of 1-(2-dimethylaminoethyl)-3-ethyl-5,6-diaminouracil hydrochloride in 150 parts of water is added 120 parts of ethanol, 10.5 parts of acetic acid, and 10.5 parts of benzil. The reaction mixture is heated at reflux for about 1½ hours, then is evaporated to a volume of about 100 parts, resulting in removal of most of the organic solvent. To the resulting aqueous mixture is then added 100 parts of water and 50 parts by volume of 5 N aqueous sodium hydroxide. The oily layer which separates is extracted with methylene chloride, and the resulting organic solution is dried over anhydrous sodium sulfate, then is evaporated to dryness to afford 1 - (2 - dimethylaminoethyl)-3-ethyl-6,7-diphenyl-1,2,3,4-tetrahydro-2,4-pteridinedione as a syrup.

A solution of the latter syrup in 80 parts of methanol is made acidic by the addition of 10 parts by volume of 6.9 N ethanolic hydrogen chloride, then is diluted with 175 parts of anhydrous ether. The crystals which separate on standing are collected by filtration, then recrystallized from methanol-anhydrous ether, resulting in 1-(2-dimethylaminoethyl) - 3 - ethyl-6,7-diphenyl-1,2,3,4-tetrahydro-2,4-pteridinedione hydrochloride which melts at about 258–260°. It is represented by the structural formula

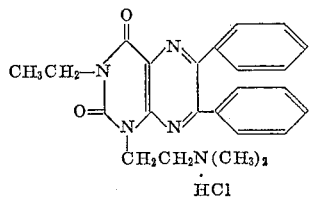

Example 13

A mixture of 3.2 parts of 1-(2-dimethylaminoethyl)-3-ethyl-5,6-diaminouracil, 20 parts of water, 5.28 parts by volume of 2.5 N hydrochloric acid, 2.1 parts of acetic acid, and 1.58 parts of ethyl pyruvate is heated on a steam bath for about 30 minutes, then is cooled and neutralized by the addition of 5 N aqueous sodium hydroxide. After standing at 5° for about 3 hours, the crystals which separate are collected by filtration, washed on the filter with a small amount of cold water, then recrystallized from water to produce pure 1-(2-dimethylaminoethyl)-3-ethyl-6 - methyl - 7 - hydroxy-1,2,3,4-tetrahydro-2,4-pteridinedione, obtained as a colorless solid melting at about 292–294° (dec.). This substance is characterized further by the structural formula

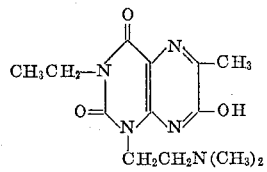

Example 14

To a solution of 4.8 parts of 1-allyl-3-(2-hydroxypropyl)-5,6-diaminouracil in 70 parts of water is added successively 6.3 parts of acetic acid and 3.04 parts of phenylglyoxal monohydrate. The resulting reaction mixture is heated on the steam bath for about 30 minutes, during which time a voluminous yellow precipitate forms. The reaction mixture is then cooled and the yellow precipitate is collected by filtration, washed with water, and dried. Recrystallization from ethanol results in pure 1 - allyl - 3 - (2 - hydroxypropyl) - 7 - phenyl - 1,2,3,4-tetrahydro-2,4-pteridinedione, melting at about 188–189°. This compound is represented by the structural formula

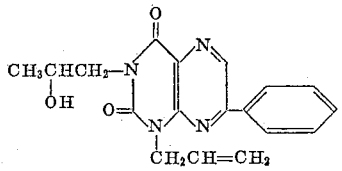

Example 15

To a solution of 4.8 parts of 1-allyl-3-(2-hydroxypropyl)-5,6-diaminouracil in 60 parts of water is added successively 6.3 parts of acetic acid and a solution of 4.2 parts of benzil in 48 parts of warm ethanol. This reaction mixture is heated at the reflux temperature for about one hour, then is partially concentrated in order to remove most of the ethanol. The solid which separates during the distillation process is collected by filtration, washed on the filter with water, and dried. Recrystallization of this crude material from ethyl acetate-hexane affords pure crystals of 1-allyl-3-(2-hydroxypropyl)-6,7-diphenyl-1,2,3,4-tetrahydro-2,4-pteridinedione, melting at about 176–177°. It is represented by the structural formula

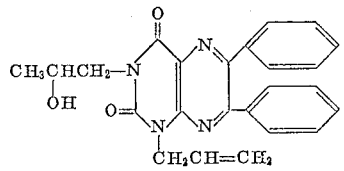

Example 16

To a solution of 4.8 parts of 1-allyl-3-(2-hydroxypropyl)-5,6-diaminouracil in 70 parts of water is added successively 6.3 parts of acetic acid and 3.48 parts of ethyl pyruvate. This reaction mixture is heated on the steam bath for about one hour, then is cooled and treated with 4.94 parts of concentrated hydrochloric acid. This acidic mixture is stored at 5° for about 24 hours, at the end of which time the crystals which have separated are collected by filtration, washed on the filter with water, then dried. Recrystallization of this material from water produces 1 - allyl - 3 - (2 - hydroxypropyl) - 6 - methyl-7 - hydroxy - 1,2,3,4 - tetrahydro - 2,4 - pteridinedione, melting at about 215–217°. This compound is represented by the structural formula

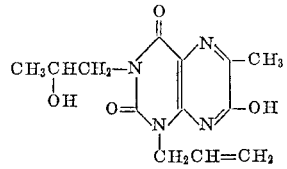

Example 17

To a solution of 4.8 parts of 1-allyl-3-(2-hydroxypropyl)-5,6-diaminouracil in 60 parts of water is added successively 6.3 parts of acetic acid and a solution of 3.8 parts of furil in 96 parts of warm ethanol. The resulting reaction mixture is heated at the reflux temperature for about 30 minutes, then is stored at room temperature for about 2 hours, and is clarified by filtration. Approximately 150 parts of water is added, and this mixture is allowed to stand at room temperature for about 24 hours. The solid which separates is collected by filtration, then is recrystallized from ethanol, resulting in pure 1-allyl-3-(2 - hydroxypropyl) - 6,7 - difuryl - 1,2,3,4 - tetrahydro-2,4-pteridinedione, obtained as a bright yellow solid, melting at about 156–158° and represented by the structural formula

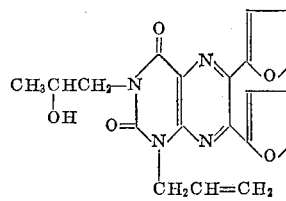

Example 18

To a solution of 5.6 parts of 1-allyl-3-(2,3-dihydroxypropyl)-5,6-diaminouracil in 64 parts of water is added successively 6.3 parts of acetic acid and a solution of 4.2 parts of benzil in 48 parts of warm ethanol. This reaction mixture is heated at the reflux temperature for about one hour, then is concentrated to a volume of about 70 parts, resulting in removal of most of the ethanol. The oil which separates is extracted into benzene, and the benzene solution is washed with water, dried over anhydrous sodium sulfate, and adsorbed on a silica gel chromatographic column. Elution of the column with 30–70% ethyl acetate in benzene mixtures yields a fraction which is recrystallized from ethyl acetate-hexane, affording colorless crystals of 1-allyl-3-(2,3-dihydroxypropyl)-6,7-diphenyl - 1,2,3,4 - tetrahydro - 2,4-pteridine-dione, melting at about 128–130°. This compound is further characterized by the structural formula

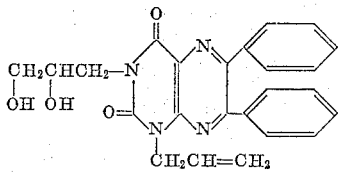

Example 19

To a solution of 5.12 parts of 1-allyl-3-(2,3-dihydroxypropyl)-5,6-diaminouracil in 40 parts of water is added successively 6.3 parts of acetic acid and 3.48 parts of ethyl pyruvate. This reaction mixture is heated on the steam bath for about one hour, then is cooled and acidified by the addition of 7.1 parts of concentrated hydrochloric acid. The acidic mixture is stored at 5° for about 72 hours, and the crystals which separate during this period are collected by filtration, washed with a small amount of cold water, and recrystallized from water to produce 1-allyl-3-(2,3-dihydroxypropyl)-6-methyl - 7 - hydroxy - 1,2,3,4-tetrahydro-2,4-pteridinedione, isolated as a colorless solid melting at about 203–205°. A structural representation of this substance is shown below

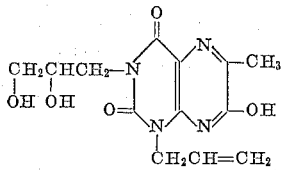

Example 20

To a solution of 5.12 parts of 1-allyl-3-(2,3-dihydroxypropyl)-5,6-diaminouracil in 70 parts of water is added 6.3 parts of acetic acid and 3.04 parts of phenyl-glyoxal monohydrate. Heating of this reaction mixture on the steam bath for about 30 minutes results in separation of a voluminous precipitate which, after cooling, is collected by filtration, washed with water, and dried. It is then recrystallized from ethanol to afford pure 1-allyl-3-(2,3-dihydroxypropyl)-7-phenyl - 1,2,3,4 - tetrahydro-2,4-pteridinedione as a yellow solid, melting at about 192–194° and characterized further by the structural formula

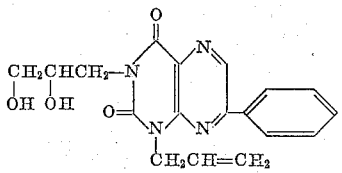

Example 21

To a solution of 6.3 parts of 1-allyl-3-ethyl-5,6-diaminouracil in 150 parts of water is added 9.45 parts of acetic acid, and this mixture is heated to about 90°, to which mixture is then added 3.48 parts of ethyl pyruvate. Heating at that temperature is continued for about 20 minutes longer, resulting in separation of a voluminous crystalline mass. This mixture is then cooled, and the crystals are collected by filtration, washed with water, and dried. Recrystallization from water results in 1-allyl-3-ethyl-6-methyl-7-hydroxy-1,2,3,4-tetrahydro - 2,4 - pteridinedione, obtained as a pale yellow solid melting at about 218–220°. It is characterized further by the structural representation

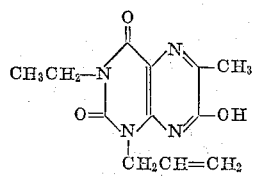

Example 22

To a solution of 2.1 parts of 1-allyl-3-ethyl-5,6-diaminouracil in 30 parts of water containing 3.15 parts of acetic acid, warmed to about 75°, is added a solution of 2.1 parts of benzil in 24 parts of ethanol. The resulting reaction mixture is heated at reflux for about one hour, then is cooled and diluted with 30 parts of water. After standing at room temperature for about 24 hours, the crystalline product is collected by filtration, washed with water, then recrystallized from ethanol to produce pure colorless 1-allyl-3-ethyl-6,7-diphenyl-1,2,3,4-tetrahydro-2,4-pteridinedione, melting at about 160–162°. It is further characterized by the structural formula

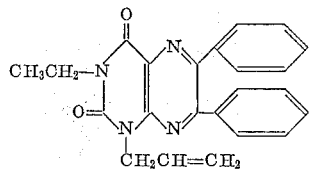

Example 23

To a solution of 4.2 parts of 1-allyl-3-ethyl-5,6-diaminouracil in 40 parts of water containing 6.3 parts of acetic acid, heated to about 75°, is added a solution of 3.56 parts of ethyl phenylglyoxalate in 24 parts of ethanol. This reaction mixture is heated at the reflux temperature for about 30 minutes, causing a precipitate to form. The mixture is then cooled, and the precipitate is collected by filtration, washed with water, and recrystallized from 75% aqueous ethanol, resulting in pale yellow crystals of pure 1-allyl-3-ethyl-6-phenyl-7-hydroxy-1,2,3,4-tetrahydro-2,4-pteridinedione, displaying a melting point of about 217–219°. This substance is represented by the structural formula

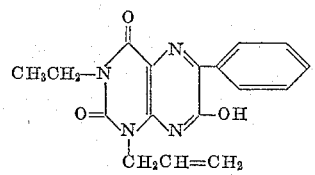

Example 24

The reaction of 13.5 parts of 1-(3-diethylaminopropyl)-3-propyl-5,6-diaminouracil and 7.9 parts of 4,5-octanedione according to the procedure of Example 10 results in 1-(3-diethylaminopropyl)-3,6,7 - tripropyl - 1,2,3,4-tetrahydro-2,4-pteridinedione.

Example 25

By substituting 2.24 parts of 1-methallyl-3-ethyl-5,6-diaminouracil and otherwise proceeding according to the processes of Example 22, 1-methallyl-3-ethyl-6,7-diphenyl-1,2,3,4-tetrahydro-2,4-pteridinedione is obtained.

Example 26

The substitution of 5.08 parts of 1-allyl-3-(4-hydroxybutyl)-5,6-diaminouracil in the procedure described in Example 15 affords 1-allyl-3-(4-hydroxybutyl)-6,7-diphenyl-1,2,3,4-tetrahydro-2,4-pteridinedione.

Example 27

By substituting 8.7 parts of 2,3-nonanedione and otherwise proceeding according to the processes described in Example 10, 1-(2-dimethylaminoethyl)-3-ethyl-6-methyl-7-hexyl-1,2,3,4-tetrahydro-2,4-pteridinedione and 1-(2-dimethylaminoethyl)-3-ethyl-6-hexyl-7-methyl-1,2,3,4 - tetrahydro-2,4-pteridinedione are obtained.

Example 28

The substitution of one part of 2-oxo-3-methylbutyraldehyde in the procedure described in Example 22 affords 1 - allyl - 3 - ethyl-6-isopropyl-1,2,3,4-tetrahydro-2,4- pteridinedione and 1-allyl-3-ethyl-7-isopropyl-1,2,3,4-tetrahydro-2,4-pteridinedione.

*Example 29*

By substituting 1.77 parts of ethyl 2-oxobutyrate and otherwise proceeding according to the procedure of Example 13, 1-(2-dimethylaminoethyl)-3,6-diethyl-7-hydroxy-1,2,3,4-tetrahydro-2,4-pteridinedione is obtained.

What is claimed is:
1. A compound of the structural formula

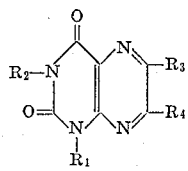

wherein $R_1$ is selected from the group consisting of lower alkenyl and

—(lower alkylene)-N(lower alkyl)$_2$ radicals, $R_2$ is selected from the group consisting of lower alkyl, hydroxy(lower alkyl), and dihydroxy(lower alkyl) radicals, $R_3$ is a member of the class consisting of hydrogen, lower alkyl, phenyl, and furyl radicals, and $R_4$ is a member of the class consisting of hydrogen, lower alkyl, phenyl, furyl, and hydroxy radicals.

2. 1 - (2 - dimethylaminoethyl) - 3 - ethyl - 1,2,3,4-tetrahydro-2,4-pteridinedione.
3. 1 - (2 - dimethylaminoethyl) - 3 - ethyl - 7 - phenyl-1,2,3,4-tetrahydro-2,4-pteridinedione.
4. 1 - (2 - dimethylaminoethyl) - 3 - ethyl - 6,7 - diphenyl-1,2,3,4-tetrahydro-2,4-pteridinedione.
5. 1 - (2 - dimethylaminoethyl) - 3 - ethyl - 6 - methyl-7-hydroxy-1,2,3,4-tetrahydro-2,4-pteridinedione.
6. 1 allyl - 3 - (2 - hydroxypropyl) - 7 - phenyl - 1,2,3,4-tetrahydro-2,4-pteridinedione.
7. 1 - allyl - 3 - (2 - hydroxypropyl) - 6 - methyl - 7-hydroxy-1,2,3,4-tetrahydro-2,4-pteridinedione.
8. 1 - allyl - 3 - (2 - hydroxypropyl) - 6,7 - difuryl-1,2,3,4-tetrahydro-2,4-pteridinedione.
9. 1 allyl - 3 - (2,3 - dihydroxypropyl) - 6,7 - diphenyl-1,2,3,4-tetrahydro-2,4-pteridinedione.
10. 1 - allyl - 3 - (2,3 - dihydroxypropyl) - 6 - methyl-7-hydroxy-1,2,3,4-tetrahydro-2,4-pteridinedione.
11. 1 - allyl - 3 - (2,3 - dihydroxypropyl) - 7 - phenyl-1,2,3,4-tetrahydro-2,4-pteridinedione.
12. 1 - allyl - 3 - ethyl - 6 - methyl - 7 - hydroxy - 1,2,3,4-tetrahydro-2,4-pteridinedione.
13. 1 - allyl - 3 - ethyl - 6 - phenyl - 7 - hydroxy - 1,2,3,4-tetrahydro-2,4-pteridinedione.
14. A compound of the structural formula

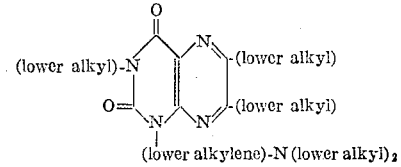

15. 1 - (2 - dimethylaminoethyl) - 3 - ethyl - 6,7-dimethyl-1,2,3,4-tetrahydro-2,4-pteridinedione.
16. A compound of the structural formula

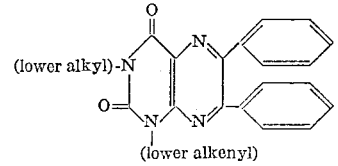

17. 1 - allyl - 3 - ethyl - 6,7 - diphenyl - 1,2,3,4 - tetrahydro-2,4-pteridinedione.
18. A compound of the structural formula

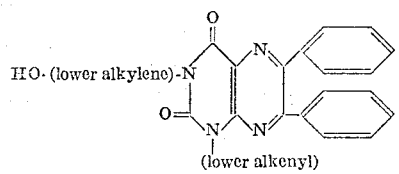

19. 1 - allyl - 3 - (2 - hydroxypropyl) - 6,7 - diphenyl-1,2,3,4-tetrahydro-2,4-pteridinedione.
20. 1 - (2 - dimethylaminoethyl) - 3 - ethyl - 6-aminouracil.

References Cited in the file of this patent
UNITED STATES PATENTS

| | | |
|---|---|---|
| 2,748,119 | Rorig | May 29, 1956 |
| 2,790,802 | Brockman et al. | Apr. 30, 1957 |
| 2,804,459 | Drinkard | Aug. 27, 1957 |
| 2,973,359 | Petering | Feb. 28, 1961 |

OTHER REFERENCES

Weissenburger: Chemical Abstracts, vol. 50 (1956), column 12,069 (Abstract of Arch. Pharm. 288 (1955), pages 532–5).